June 19, 1962  F. G. VAN ZIJP  3,039,761
DAMPED AIR SPRING
Filed Feb. 19, 1960

INVENTOR
FREDERIK G. VAN ZIJP
BY *Imirie and Smiley*
ATTORNEYS.

United States Patent Office 3,039,761
Patented June 19, 1962

3,039,761
DAMPED AIR SPRING
Frederik G. van Zijp, The Hague, Netherlands, assignor to Werkspoor N.V., Amsterdam, Netherlands, a company of the Netherlands
Filed Feb. 19, 1960, Ser. No. 9,742
Claims priority, application Netherlands Feb. 24, 1959
1 Claim. (Cl. 267—65)

The invention relates to an air spring which consists of a spring bellows. It is the object of the invention to provide an improved air spring of this type which affords adequate damping over a wide frequency range. According to the invention this is achieved in that two auxiliary reservoirs are provided which are connected to the spring bellows, whilst there are further damping organs provided in the communicating passage between the said bellows and the said reservoirs, said damping organs being dimensioned such, that they provide maximum damping each for a different frequency. Thus, it is attained, that the damping effects, as obtained by each one of the damping organs, may be superposed which flattens the shape of the resulting characteristic curve representing the damping as function of frequency.

According to the invention the damping organs may be constituted by throttling openings (or apertures) of different size. Also they may in accordance with the invention be constituted by chambers filled with a porous material.

The invention will be elucidated in the following description of a number of embodiments and with reference to the accompanying drawing, in which.

Figure 1:
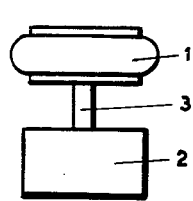
FIG. 1 is a schematic representation of a known air spring.
Figure 2:
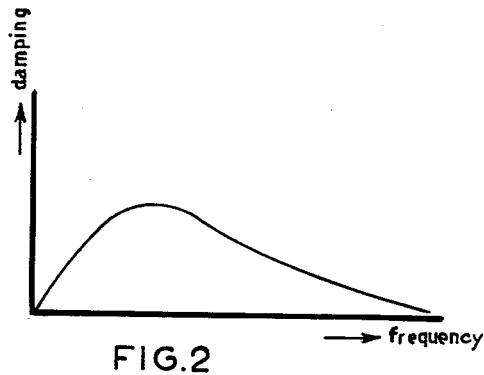
FIG. 2 is a representation of the characteristic damping curve of the air spring illustrated in FIG. 1.

FIG. 1 shows a known construction of an air spring having a bellows 1 which is connected to an auxiliary reservoir 2 via a communicating passage 3. The capacity of the reservoir 2 in relation to the capacity of the bellows 1 fixes or determines the spring rate (weight/deflection). When with such air springs it is desired to realise a certain amount of damping, then the communicating passage 3 can be made narrow, so that by reason of this small passage a damping effect occurs. In that case the air spring of FIG. 1 has a characteristic damping curve of the shape illustrated in FIG. 2.

With vibrations of low frequency the small communicating passage 3 will function as a free direct communication and in the case of vibrations of high frequency the said passage will function as a shut off, which means that in both cases the percentage of vibrations absorbed is decreased. Hence, with this known construction damping occurs only within a comparatively small frequency range.

Figure 3:
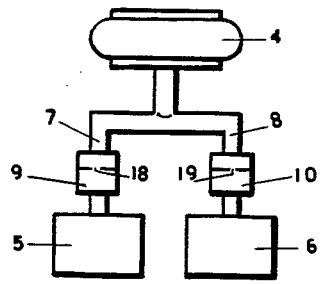
FIG. 3 is a schematic representation of an air spring according to the invention.
Figure 5:
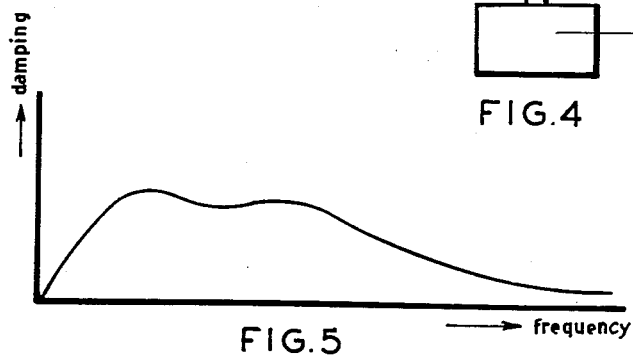
FIG. 5 is a representation of a characteristic damping curve of an air spring in accordance with the invention.

FIG. 3 shows an air spring according to the invention in which the bellows 4 is connected to a reservoir 5 and a reservoir 6 by way of communicating passages 7 and 8. The communicating passage 7 is internally provided with a damping means 9 and the passage 8 is likewise provided with a damping means 10. The damping means 9 and 10 are dimensioned differently, so that they provide maximum damping each for a different frequency. As shown in FIG. 3 the damping means 9 and 10 comprise throttle openings 18 and 19 respectively of different size. Now, with this embodiment the characteristic damping curves of the separate damping organs may be superposed which yields a resulting characteristic damping curve the shape of which is shown in FIG. 5. From observation of this curve it will be apparent that an adequate damping is obtained in a much wider frequency range.

Figure 4:
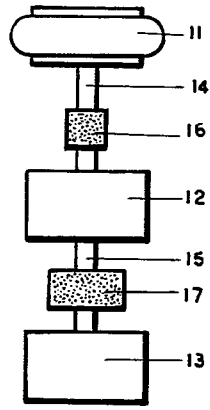
FIG. 4 is a schematic representation of another embodiment of an air spring according to the invention.

With the embodiment as illustrated in FIG. 3 the reservoirs 5 and 6 are arranged in parallel. However, an embodiment as shown in FIG. 4, having a bellows 11 and two reservoirs 12 and 13 arranged in series circuit relationship and damping means 16 and 17 incorporated in the communicating passages 14 and 15 is also feasible. Here too the damping means have individual characteristic damping curves.

The separate damping means may be constituted by throttling openings of different size. The throttling openings can also be constituted by chambers filled with a porous material as shown in FIG. 4.

What I claim is:

A pneumatic spring comprising a bellows, at least two reservoirs of constant volume, passages connecting said bellows directly to each of said reservoirs, each of said passages containing a mass of porous material affording a flow area of different size in each passage for providing maximum damping in each of said passages for a different frequency of vibration of said spring.

References Cited in the file of this patent

UNITED STATES PATENTS

| | | |
|---|---|---|
| 2,031,000 | Mercier | Feb. 18, 1936 |
| 2,702,398 | Marcus | Feb. 22, 1955 |
| 2,773,686 | Nash | Dec. 11, 1956 |
| 2,898,103 | Boulet | Aug. 4, 1959 |
| 2,902,291 | Walker | Sept. 1, 1959 |

FOREIGN PATENTS

| | | |
|---|---|---|
| 400,616 | Great Britain | Oct. 24, 1933 |
| 792,738 | France | Oct. 28, 1935 |